United States Patent [19]

Block

[11] Patent Number: 4,547,297

[45] Date of Patent: Oct. 15, 1985

[54] HIGH TEMPERATURE DRILLING MUD STABILIZER

[75] Inventor: Jacob Block, Rockville, Md.

[73] Assignee: W. R. Grace & Co., New York, N.Y.

[21] Appl. No.: 577,662

[22] Filed: Feb. 7, 1984

[51] Int. Cl.⁴ ............................................. C09K 7/02
[52] U.S. Cl. .............................. 252/8.5 A; 252/8.5 C
[58] Field of Search ............... 252/8.5 A, 8.5 B, 8.5 C

[56] References Cited

U.S. PATENT DOCUMENTS

| | | | |
|---|---|---|---|
| 3,762,485 | 10/1973 | Chesser et al. | 252/8.5 X |
| 4,349,443 | 9/1982 | Block | 252/8.5 |
| 4,389,319 | 6/1983 | Block et al. | 252/8.5 |
| 4,428,845 | 1/1984 | Block | 252/8.5 |
| 4,431,550 | 2/1984 | Block | 252/8.5 |

*Primary Examiner*—Herbert B. Guynn
*Attorney, Agent, or Firm*—Edward J. Cabic

[57] ABSTRACT

Aqueous drilling fluids containing a hydroxy containing alumina component such as AlO(OH) and a polyvinyl alcohol (PVA) reaction product such as an aldehyde reacted PVA are stabilized for use at temperatures as high as 350° F. (177° C.) by adding stabilizer anions such as sulfate, tartrate and citrate to the resulting drilling fluid. The anions can be added as an acid or in the salt form with sodium and potassium salts being preferred. The salts are preferably added in 0.2 to 10% by weight of the drilling fluid. These stabilized drilling fluids can also be used in seawater.

12 Claims, No Drawings

HIGH TEMPERATURE DRILLING MUD STABILIZER

BACKGROUND OF THE INVENTION

1. Field of the Invention

This invention relates to a drilling fluid composition which is stable at temperatures of up to 350° F.

2. Description of the Previously Published Art

In U.S. Pat. No. 4,349,443 to Block there is disclosed an aqueous drilling fluid comprising the combination of a hydroxy containing alumina component having the formula AlO(OH) which is a viscosifier and a reaction product of a polyvinyl alcohol (PVA) and an aldehyde containing or generating agent which is a fluid loss control agent. A further improvement in the compositional ranges of this system is described in Block U.S. Reissue Application Ser. No. 446,217 filed Dec. 2, 1982, now U.S. Pat. No. RE. 31,748. Although this drilling fluid composition has been tested at temperatures as high as 122° C. (252° F.) as described in the patent, there is no information on how the drilling fluid would behave at deeper well depths when the temperature approaches 350° F. (177° C.).

An improved method of making the AlO(OH) viscosifier component for the above-described system is described by Block in U.S. Pat. No. 4,431,550. When the AlO(OH) is being formed by reacting a base and an acid it is stabilized by having present in the reaction mixture a relatively small amount of a hydroxy acid or a salt of a hydroxy acid. The hydroxy acids described are gluconic acid, tartaric acid, gallic acid, citric acid or mixtures of these acids or their salts. These acids or salts retard the formation of tri-hydrates. The amount of the retarder used is less than 5% based on the weight of the aluminum present when expressed as AlO(OH).

3. Objects of the Invention

It is an object of this invention to formulate a drilling fluid which is stable at temperatures of about 350° F. (177° C.).

It is a further object of this invention to add a stabilizer to a drilling fluid containing AlO(OH) as a viscosifier and polyvinyl alcohol reaction product as a water loss controller to enable the composition to remain effective at temperatures of up to about 350° F. (177° C.).

It is a further object of the invention to drill a bore hole into a subterranean formation using conventional bore hole drilling equipment where the drilling fluid employed is stable up to a temperature of about 350° F.

It is a further object of this invention to formulate a drilling fluid which is stable in seawater at temperatures of up to about 350° F. (177° C.).

These and further objects will become apparent as the description of the invention proceeds.

SUMMARY OF THE INVENTION

A stable drilling mud system containing AlO(OH) as the viscosifier and polyvinyl alcohol (PVA) reaction product as the water loss controller has been achieved by incorporating a stabilizer containing bulky anions such as sulfate, tartrate, or citrate. These anions can be added either in the acid form or in a corresponding salt form. It is believed these bulky anions prevent the crystallization of the aluminum gel component and that they somehow retard the hydrolytic thermal breakdown of the PVA reaction product.

Preferred salt forms are the sodium or potassium sulfates, tartrates, and citrates. These salts can be added in an amount of from about 0.2 to 10% by weight based on the weight of the total aqueous drilling fluid containing the AlO(OH) and the PVA reaction product.

This stabilized drilling fluid composition can also be used in seawater at temperatures of up to 350° F. This will permit the use of the drilling fluid in deeper, hotter offshore wells.

DESCRIPTION OF THE PREFERRED EMBODIMENTS

The preparation of the AlO(OH) and an aldehyde reacted PVA are described in the Block U.S. Pat. No. 4,349,443. Further extended ranges for some of the components are described in Block Reissue Application Ser. No. 446,217 filed Dec. 2, 1982. For making the AlO(OH), Block U.S. Pat. No. 4,431,550 describes a preferred procedure to retard trihydrate formation by making the AlO(OH) in the presence of a small amount of a hydroxy acid or a salt of a hydroxy acid. For making the PVA reaction product, Green and Block U.S. Pat. No. 4,411,800 describes PVA reaction products made with both an aldehyde containing or generating compound and an epihalohydrin. In the case of the aldehyde reaction it is to take place in an aqueous acidic medium having a pH of less than about 5.5 while in the case of the epihalohydrin the reaction takes place in an aqueous basic medium having a pH of at least about 9.5. For the epihalohydrin the halo group can be Cl or Br and the epihalohydrin can be substituted with a $C_1$–$C_3$ alkyl group such as methyl, ethyl or propyl. The most preferred epihalohydrin is epichlorohydrin due to its availability and superior product formed. The entire contents of these patents and this application are incorporated herein by reference.

The stabilizers to be used according to the present invention are the salts or the corresponding acids of the various bulky anions such as sulfate, tartrate or citrate. One common form of the tartrate is the NaK salt known as Rochelle salt. These materials are commerically available. They are preferably present in the drilling fluid composition in an amount of from about 0.2 to 10% by weight based on the weight of the aqueous drilling fluid. In this drilling fluid the AlO(OH) viscosifier is preferably present in an amount of from about 0.3 to 5 wt.% (AlO(OH) basis) and the PVA reaction product is preferably present in an amount of from about 0.3 to 5 wt.%. The especially preferred anions are sulfate and tartrate and the preferred salts are sodium sulfate, sodium potassium tartrate and sodium tartrate.

The sodium salts appear to be more effective in stabilizing the PVA reaction product such as an aldehyde-reaction PVA than the potassium salts although both the potassium and sodium salts are effective for stabilizing the AlO(OH).

Although the exact mechanism of the stabilization is not known, it is believed that the bulky anions replace previously adsorbed chloride ions in the alumina gel thereby preventing crystallization and thus maintaining the shear-thinning properties of the alumina gel. Some of these salts, especially those containing sodium as the cation, also stabilize the PVA reaction product probably by a solubility reducing effect caused by the highly hydrated sodium ion. It is for this reason that the sodium salts are particularly preferred.

The stabilizer can be added to the composition in any of many ways. It can be added to the AlO(OH), it can be added to the PVA reaction product, it can be added to a drilling fluid which already contains the AlO(OH) and the PVA reaction product, or any combination thereof.

The drilling fluid composition according to the present invention are capable of imparting to a clay-free, (the term "clay-free" when used herein refers to the absence of drilling fluid viscosifying clays as an essential agent of the fluid and not to other materials entrained therein) aqueous system, such as a water-based drilling fluid (the term "fluid" or "system" when used herein refers to water-based systems containing the subject composition), non-Newtonian, pseudoplasticity. That is to say, that the viscosity of the resultant fluid varies inversely with respect to the shear rate exterted on the fluid. The relationship of the shear stress with respect to shear rate can be defined by the rheological power law model relationship of $$\tau = K(\gamma)^n$$

in which $\tau$ represents the shear stress exerted on the aqueous system of the drilling fluid in units such as pounds per 100 ft$^2$ or dynes/cm$^2$; $\gamma$ is the shear rate in units of reciprocal time such as sec$^{-1}$; and n is a numerical value greater than zero. When n=1, the system is Newtonian; if n is less than 1, the system is pseudoplastic, and if n is greater than 1, the system is dilatant. The fluids containing the presently described composition exhibit shear stress ($\tau$) properties at varying shear rates ($\gamma$) in the range of from about 10 to 400 sec$^{-1}$, that is, in the range normally encountered in the annular region of the bore hole such that n of the power law relationship has a value of less than about 0.4. Such systems, therefore, exhibit non-Newtonian, pseudoplastic properties to an exceptionally high and desirable degree.

Test Procedures

Rheological Properties

The drilling fluid, adjusted to a pH of 9.5, was tested for its rheological properties using a standard procedure with a Haake Rotovisco rheometer (Model RV-3) at varying shear rates and at 25° C. The values of n and K (given as pounds-sec/100 ft$^2$ in all examples) in the power law model relationship were determined.

For the roller oven tests, the aqueous fluid consisting of the AlO(OH) viscosifier and the PVA reaction product water loss controller at pH 9.5 was placed in a bomb, pressurized to 150 psig with nitrogen and placed in a roller over at 350° F. for 16 hours. After removal, the sample was cooled, the pH was readjusted to 9.5 with NaOH, and the rheological properties determined as above.

If the K value declines and the n value increases to about 1, this indicates rheological failure.

Fluid Loss Test

The fluid loss properties of these drilling fluids before and after roller oven heating tests were determined by the American Petroleum Institute procedure API No. RP-13B. At ambient temperature a sample was placed in a vessel having a screen on the bottom over which a specially treated filter paper was placed. Pressure (100 psig) was applied. The amount of liquid that initially came out was the spurt. This along with the remaining amount of liquid that flows out in 30 minutes was measured in cubic centimeters and identified as the total fluid loss, TFL. It is desirable to have the TFL value less than 15 cm$^3$ and more preferably at a value of 10 cm$^3$ or less. Fluid loss values above 20 cm$^3$ are considered poor. The resulting cake that formed on the filter paper after the 30 minute test were measured as the cake thickness.

Having described the basic aspects of our invention, the following examples are given to illustrate specific embodiments thereof.

EXAMPLE 1

This example illustrates the production of AlO(OH) to be used in evaluating the stabilizer.

The AlO(OH) component was prepared by reacting a hydrochloric acid solution with a sodium aluminate solution at a pH of 9. The sodium aluminate solution and thereby the resulting AlO(OH) were inhibited according to U.S. Pat. No. 4,431,550 to prevent trihydrate formation by using a gluconate-tartrate combination as described in Example 1 of the patent at a concentration of 0.3 wt.% gluconic acid and 1.4 wt.% tartaric acid based on AlO(OH), except that the gluconate anion was added to sodium gluconate and the tartrate anion was added as sodium potassium tartrate. The resulting AlO(OH) was filtered and then de-watered on a double-drum dryer to yield a dried product having about 16% AlO(OH), 10% NaCl and 75% total volatiles. X-ray diffraction showed that the product was pseudoboehmite.

EXAMPLE 2

This example illustrates the production of the aldehyde reacted PVA to be used in evaluating the stabilizer.

The aldehyde reacted PVA was prepared by reacting PVA with formaldehyde by the continuous process disclosed in Example 1 in Blouin U.S. patent application Ser. No. 553,410, filed Nov. 21, 1983, except that the polyvinyl alcohol was the finer size Gelvatol 9000. The entire content of this patent application is incorporated herein by reference.

EXAMPLE 3

This example describes a preparation of a drilling fluid to be used for evaluating the stabilizers according to the present invention.

A drilling fluid was prepared by adding to water the AlO(OH) made in Example 1 and the aldehyde reacted PVA made in Example 2. The final composition contained 2.4% AlO(OH) and 1.6% aldehyde reacted PVA. This unstabilized drilling fluid was initially tested for its rheology and water-loss properties and had an n of 0.17, a K of 9.3 lb-sec/100 ft$^2$, a TFL of 6.4 cm$^3$, a spurt of 0.0 cm$^3$ and a cake thickness of 1/32 inch.

EXAMPLE 4

This example illustrates the rheological properties for the drilling fluid of Example 3 after it has been heated to 350° F. for 16 hours and with the stabilizers according to the present invention.

The drilling fluid of Example 3 was tested for thermal stability alone and in the presence of various salts by being heated in a roller oven at 350° F. (average temp.) for 16 hours. After the heat treatment the rheological properties were determined using a Haake RV-3 Rheometer. The test results are set forth in Table 1 below.

TABLE 1

| Run | Additive | wt. % additive(a) | Rheology | | | |
|---|---|---|---|---|---|---|
| | | | n(b) | K(b) (d) | n(c) | K(c) (d) |
| 1 | None | 0.0 | 0.57 | 0.27 | 0.41 | 0.52 |
| 2 | NaCl | 1.0 | 0.30 | 1.2 | 0.23 | 1.9 |
| 3 | " | 2.0 | 0.48 | 0.5 | 0.40 | 0.57 |
| 4 | Na$_2$SO$_4$ | 1.0 | 0.14 | 5.8 | 0.19 | 8.3 |
| 5 | " | 2.0 | 0.18 | 10.0 | 0.28 | 14.8 |
| 6 | Na$_2$CO$_3$ | 1.0 | 0.85 | 0.1 | 0.83 | 0.1 |
| 7 | " | 2.0 | 1.0 | 0.1 | (e) | (e) |
| 8 | Sodium Gluconate | 0.5 | 0.23 | 2.8 | (e) | (e) |
| 9 | Sodium Gluconate | 1.0 | 0.19 | 3.4 | (e) | (e) |
| 10 | Sodium Potassium Tartrate (Rochelle Salt) | 0.5 | 0.21 | 3.7 | 0.11 | 18.0 |
| 11 | Sodium Potassium Tartrate (Rochelle Salt) | 1.0 | 0.21 | 2.9 | 0.14 | 15.5 |
| 12 | Sodium Citrate | 0.5 | 0.12 | 24.0 | 0.15 | 28.0 |
| 13 | Sodium Citrate | 1.0 | 0.12 | 19.0 | 0.20 | 25.0 |

(a)Based on total weight of system.
(b)After 16 hours at 350° F.
(c)After the 16 hours of (b) and then an additional 5 minutes re-shear in a Hamilton Beach mixer.
(d)lb-sec/100 ft$^2$
(e)Not determined The results show that the sulfate, tartrate and citrate anions were especially effective in stabilizing the system. The chloride and fluconate were only moderately effective and the carbonate was ineffective.

EXAMPLE 5

This example illustrates the water-loss properties of the heated drilling fluids from Example 4.

The more effective drilling fluids of Example 4 which had been subjected to the 16 hour heat treatment were tested for water-loss according to the API method of Procedure 13B. The test results are set forth in Table 2 below.

TABLE 2

| Run | Additive | wt. % Additive(a) | Fluid Loss(b) | | |
|---|---|---|---|---|---|
| | | | Total (cm$^3$) | Spurt (cm$^3$) | Cake Thickness (inch) |
| 1 | None | 0.0 | 41.6 | 0.0 | 4/32 |
| 2 | Na$_2$SO$_4$ | 1.0 | 67.0 | 0.0 | 6/32 |
| 3 | " | 2.0 | 6.0 | 0.0 | 1/32 |
| 4 | Sodium Gluconate | 0.5 | 59.5 | 4.0 | 12/32 |
| 5 | Sodium Gluconate | 1.0 | 31.5 | 1.0 | 6/32 |
| 6 | Sodium Potassium Tartrate (Rochelle Salt) | 0.5 | 12.0 | 2.7 | 4/32 |
| 7 | Sodium Potassium Tartrate (Rochelle Salt) | 1.0 | 7.5 | 0.0 | 2/32 |
| 8 | Sodium Citrate | 0.5 | 32.5 | 9.6 | 4/32 |
| 9 | Sodium Citrate | 1.0 | 27.4 | 7.8 | 4/32 |

(a)Based on total weight of system.
(b)After 16 hours at 350° F. and after 5 minutes re-shear in a Hamilton Beach mixer.

The results show that Na$_2$SO$_4$ at the 2% level and Rochelle salt at the 1.0% level were very effective in stabilizing the water loss controller.

EXAMPLE 6

This example illustrates that the Rochelle salt is effective in a seawater system.

A drilling fluid was prepared in a manner similar to Example 3 with the exception that a synthetic seawater was used instead of tap water. The final AlO(OH) concentration was 2.0% and the aldehyde reacted PVA concentration was 1.4%. Rochelle salt in an amount of 0.4 wt.% was added to the mixture, and the material had an n of 0.34, a K of 1.2 lb-sec/100 ft$^2$, a TFL of 7.2, a spurt of 0.0 and a cake thickness of 1/32 inch. After heating at 350° F. for 16 hours and re-shearing for 5 minutes the properties are summarized in Table 3 below.

TABLE 3

| Run | wt. % Rochelle Salt | Rheology | | Fluid Loss | | |
|---|---|---|---|---|---|---|
| | | n | K ($\frac{lb\text{-}sec}{100 \, ft^2}$) | Total (cm$^3$) | Spurt (cm$^3$) | Cake Thickness (inch) |
| 1 | 0 | 0.59 | 0.16 | 107 | 11 | 12/32 |
| 2 | 0.4 | 0.19 | 5.2 | 8.8 | 0.3 | 2/32 |

The data in Table 3 shows the Rochelle salt is very effective in stabilizing the drilling fluid in salt water.

It is understood that the foregoing detailed description is given merely by way of illustration and that many variations may be made therein without departing from the spirit of this invention.

What is claimed is:

1. In a composition capable of imparting to clay-free aqueous systems a combination of pseudoplasticity and fluid loss control comprising a mixture of a hydroxy containing alumina component having the formula AlO(OH) and a reaction product formed either (a) in an aqueous acidic medium having a pH of less than about 5.5 between polyvinyl alcohol and a compound containing at least an aldehyde group therein or capable of generating in situ at least one aldehyde group or (b) in an aqueous basic medium having a pH of at least about 9.5 between polyvinyl alcohol and an epihalohydrin, the improvement wherein the mixture has added to it a high temperature stabilizing effective amount of a stabilizer which is a sodium or potassium salt of an anion selected from the group consisting of sulfate, tartrate, citrate and mixtures thereof, said salt being present in an amount such that when the composition is added to water to form an aqueous drilling fluid the salt is present in an amount of 0.5 to 10 wt.% based on the total weight of the aqueous drilling fluid.

2. The composition according to claim 1, wherein the salt is sodium sulfate, sodium potassium tartrate or sodium tartrate.

3. The composition according to claim 1, wherein the compound containing at least one aldehyde group is formaldehyde or glutaraldehyde and the epihalohydrin is epichlorohydrin.

4. In a water-based, clay-free drilling fluid suitable for circulating in a bore hole while drilling the bore hole into subterranean formations which fluid includes water, a hydroxy containing alumina component having the formula AlO(OH) as a rheology enhanced agent, and a reaction product formed either (a) in an aqueous acidic medium having a pH of less than about 5.5 between polyvinyl alcohol and a compound containing at least an aldehyde group therein, or capable of generating in situ at least one aldehyde group, or (b) in an aqueous basic medium having a pH of at least about 9.5 between polyvinyl alcohol and an epihalohydrin,
the improvement wherein the drilling fluid has added to it a sodium or potassium salt of an anion selected from the group consisting of sulfate, tartrate, citrate and mixtures thereof which is present in said fluid in from about 0.5 to 10 percent by weight based on the weight of the total drilling fluid.

5. The drilling fluid according to claim 4, wherein the salt is sodium sulfate, sodium potassium tartrate, or sodium tartrate.

6. The drilling fluid according to claim 4, wherein the compound containing at least one aldehyde group is formaldehyde or glutaraldehyde and the epihalohydrin is epichlorohydrin.

7. In a process of drilling a bore hole into a subterranean formation using conventional bore hole drilling equipment, the improvement comprising circulating in the bore hole while drilling the drilling fluid composition of claim 4.

8. In a process of drilling a bore hole into a subterranean formation using conventional bore hole drilling equipment, the improvement comprising circulating in the bore hole while drilling the drilling fluid composition of claim 5.

9. In a process of drilling a bore hole into a subterranean formation using conventional bore hole drilling equipment, the improvement comprising circulating in the bore hole while drilling the drilling fluid composition of claim 6.

10. In a process of drilling a bore hole into a subterranean formation containing seawater using conventional bore hole drilling equipment, the improvement comprising circulating in the bore hole while drilling the drilling fluid composition of claim 4.

11. In a process of drilling a bore hole into a subterranean formation containing seawater using conventional bore hole drilling equipment, the improvement comprising circulating in the bore hole while drilling the drilling fluid composition of claim 5.

12. In a process of drilling a bore hole in to a subterranean formation containing seawater using conventional bore hole drilling equipment, the improvement comprising circulating in the bore hole while drilling the drilling fluid composition of claim 6.

* * * * *